US011487731B2

(12) United States Patent  
Gupta et al.

(10) Patent No.: US 11,487,731 B2  
(45) Date of Patent: Nov. 1, 2022

(54) READ ITERATOR FOR PRE-FETCHING NODES OF A B-TREE INTO MEMORY

(71) Applicant: VMware, Inc., Palo Alto, CA (US)

(72) Inventors: Abhishek Gupta, Sunnyvale, CA (US); Richard P. Spillane, Mountain View, CA (US); Robert T. Johnson, Palo Alto, CA (US); Srinath Premachandran, Fremont, CA (US); Jorge Guerra Delgado, Fremont, CA (US); Kapil Chowksey, Cupertino, CA (US); Sandeep Rangaswamy, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 92 days.

(21) Appl. No.: 16/931,219

(22) Filed: Jul. 16, 2020

(65) Prior Publication Data

US 2021/0026825 A1 Jan. 28, 2021

Related U.S. Application Data

(60) Provisional application No. 62/878,070, filed on Jul. 24, 2019.

(51) Int. Cl.
| | |
|---|---|
| *G06F 15/16* | (2006.01) |
| *G06F 16/22* | (2019.01) |
| *G06F 16/23* | (2019.01) |
| *G06F 9/54* | (2006.01) |
| *G06F 9/50* | (2006.01) |

(52) U.S. Cl.  
CPC ........ *G06F 16/2246* (2019.01); *G06F 9/5016* (2013.01); *G06F 9/5022* (2013.01); *G06F 9/546* (2013.01); *G06F 16/2365* (2019.01)

(58) Field of Classification Search  
None  
See application file for complete search history.

(56) References Cited

U.S. PATENT DOCUMENTS

| | | | | |
|---|---|---|---|---|
| 5,204,958 | A * | 4/1993 | Cheng | G06F 16/9027 707/999.102 |
| 6,105,053 | A * | 8/2000 | Kimmel | G06F 9/5016 718/105 |
| 10,452,606 | B1 * | 10/2019 | Armangau | G06F 3/061 |
| 2005/0261859 | A1 * | 11/2005 | Petsinger | G06F 11/261 702/120 |
| 2015/0293785 | A1 * | 10/2015 | Murphy | G06F 9/5027 718/102 |
| 2016/0125008 | A1 * | 5/2016 | Huang | G06F 12/02 707/753 |
| 2016/0275719 | A1 * | 9/2016 | Oke | G06T 17/005 |
| 2019/0163765 | A1 * | 5/2019 | Byun | G06F 11/14 |

* cited by examiner

*Primary Examiner* — Alex Gofman  
(74) *Attorney, Agent, or Firm* — Patterson & Sheridan, LLP

(57) ABSTRACT

Embodiments described herein are related to a method of scanning a B-tree. For example, a method comprises receiving a scan request to scan a B-tree having a plurality of levels, each level comprising one or more nodes, wherein for each of one or more levels of the plurality of levels, nodes are grouped into groups, where nodes of any given group are stored across sequential disk blocks. The method further comprises generating a queue for each level of the B-tree. For each queue, the method further comprises loading into memory a next group of nodes based upon determining a storage location of a node of the next group of nodes.

18 Claims, 6 Drawing Sheets

READ ITERATOR FOR PRE-FETCHING NODES OF A B-TREE INTO MEMORY

CROSS-REFERENCE TO RELATED APPLICATIONS

This application claims priority to U.S. Provisional Patent Application No. 62/878,070 filed Jul. 24, 2019. The content of the provisional application is hereby incorporated by reference in its entirety.

BACKGROUND

B-trees are frequently used in various storage or database systems as a method and structure of storing data. Such storage systems may include one or more physical or virtual devices, including conventional hard disk drives of a computing device, Storage Area Network (SAN) devices or Virtual Storage Area Network (vSAN) devices. B-trees feature a balancing tree structure where inserted data is sorted during insertion. A B-tree is typically a multi-level data structure including a set of nodes, each node containing one or more key-value pairs (also referred to as "tuples"). A key is an identifier of data, and a value is either the data itself or a pointer to a location (e.g., in memory or on disk) of the data associated with the identifier. More specifically, a B-tree's top level generally includes a root node of a B-tree, which has no parent node. The middle level(s) of a B-tree comprise(s) branch nodes which have both parent and child nodes. The bottom level of a B-tree may comprise leaf nodes with no children.

A B-tree may be sorted according to the keys of the tuples, and data can be read/written from the tree based on the key associated with the data. Because B-trees contain sorted tuples, a read operation such as a scan or a query (e.g., a request for the value associated with a particular key in a data structure) to a B-tree may be completed by traversing the B-tree relatively quickly to find the desired tuple based on the corresponding key. Thus, B-trees can be used to store data in a way that improves performance relative to other data structures (such as arrays) for certain operations (e.g., a query to an un-sorted array).

Scanning a B-tree generally involves, for example, traversing a non-leaf node in order to reach a desired leaf node, scanning the leaf node, and then traversing up to the non-leaf node or the leaf node's parent again in order to determine the storage location of the next child leaf nodes. However, traversing to a parent node, or a parent of a parent node (i.e., grandparent node) and so on, to determine the storage location of the next leaf node is not resource efficient because it results in more compute cycles and a higher latency.

DETAILED DESCRIPTION

The following description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

It is noted that the term "node" may generally refer to a logical component (e.g., component object or data partition) within a logical storage system (e.g., a virtual disk) or a physical storage system, and is generally used when describing hierarchical relationships between logical components (e.g., sibling, parent, child, or the like).

Figure 1:
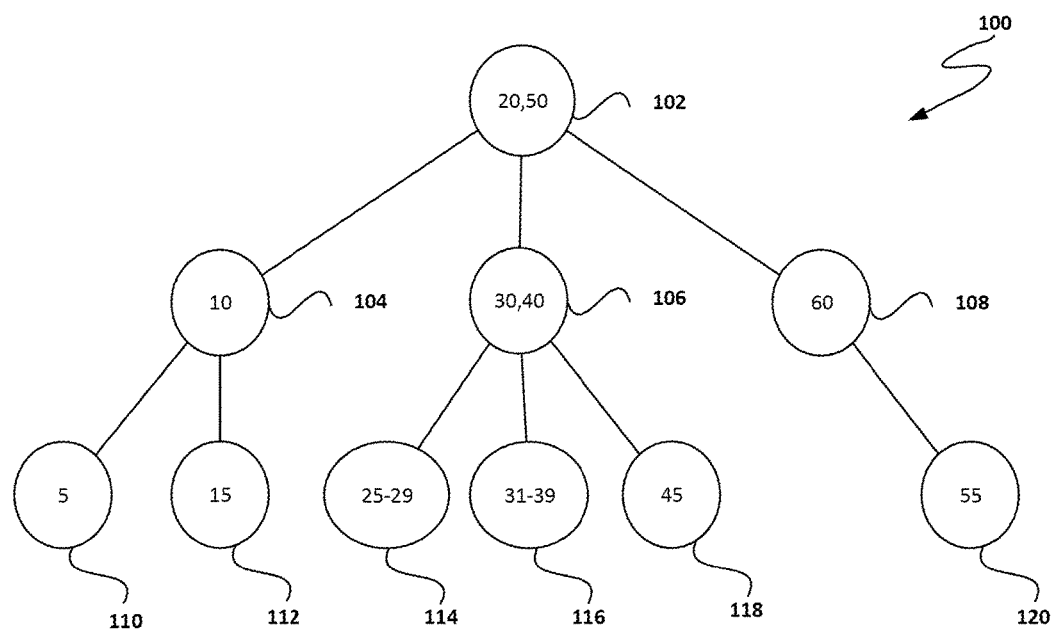
FIG. 1 illustrates a block diagram of an example B-tree, according to embodiments of the present disclosure.

FIG. 1 is a block diagram of an example B-tree 100. As illustrated, B-tree 100 includes a plurality of nodes connected in a branching tree structure. Each node has one parent but may have many children. The top node of a B-tree is root node 102, which has no parent node. The middle level of B-tree 100 includes branch nodes, which have both parent and child nodes, including branch nodes 104-108. B-tree 100 has only three levels, and thus only a single branch level, but other B-trees may have more branch levels and total levels. The bottom level of B-tree 100 is comprised of leaf nodes (also referred to as leaves) with no children, including leaf nodes 110-120. In total, B-tree 100 has ten nodes and a height of three. The height of a tree is the number of levels of nodes contained in the tree.

Each node of B-tree 100 stores at least one tuple. For example, leaf node 120 stores the tuple corresponding to key "55." Some of the leaf nodes (e.g., leaf nodes 110, 112, 118, and 120) in B-tree 100 store a single tuple while other leaf nodes (e.g., leaf nodes 114 and 116) may store additional tuples. In certain cases, a tuple in the branch and/or root nodes of B-tree 100 may store a value while in other cases it may instead store pointers to its child nodes, which can be used to locate a given tuple that is stored in a child node. For example, root node 102 includes two tuples, "20" and "50." These tuples indicate that tuples with keys less than "20" can be found by accessing branch node 104, tuples with keys greater than "20" but less than "50" can be found by accessing branch node 106, and tuples with keys greater than "50" can be found by accessing branch node 108. Tuples in all nodes of B-tree 100 are sorted based on their keys. For example, a first tuple with a first key is stored prior to a second tuple with a second key, if the second key is larger than the first key. An example of this is shown in node 106 of B-tree 100, where the tuple with key 30 is stored prior to the tuple with key 40.

Because B-tree 100 contains sorted tuples, a read operation such as a scan or a query to B-tree 100 may be completed by traversing the B-tree relatively quickly to read the desired tuple or the desired range of tuples based on the corresponding key or starting key. For example, a system with access to B-tree 100 may receive a scan query to read tuple 26 (i.e., tuple with key 26) to tuple 33. In such an example, the system starts with root node 102 and, based on the tuples therein, the system determines to traverse to branch node 106 because the starting key of the scan query is 26, which is larger than 20 and smaller than 50. Next, by examining branch node 106, the system determines that tuple 26 is in leaf node 114. As such, the system begins to read tuple 26 and moves to tuple 27 and so on until tuple 29 is read. Once tuple 29 is read, the system determines that the scan operation is not completed and that additional tuples must be read. In some cases, B-tree 100 is structured such that the system is not able to determine the memory location of the next tuples, such as tuples 31-33, unless the system traverses to and examines branch node 106 again.

In such cases, the system, therefore, traverses to and reexamines branch node 106, based on which the system determines that tuples between the range of 30 to 40 are stored in leaf node 116. Branch node 106 also comprises a pointer to the storage location of leaf node 116, which the system uses to read tuples 31-33 in leaf node 116 and complete the scan. However, traversing to a parent node, or a parent of a parent node (i.e., grandparent node) and so on, to determine the storage location of the next leaf node is not always resource efficient because it results in more compute cycles and a higher latency.

Therefore, in some cases, B-tree 100 may be structured such that a pointer may be placed at the end of each leaf node, where the pointer points to the storage location of the next leaf node. For example, a pointer may be included at the end of leaf node 114 such that after reading the last tuple 29, the system reads the pointer and determines the storage location of leaf node 116. Based on that determination, the system locates the storage location of leaf node 116 and reads tuples 31 through 33 to complete the scan query. Similarly, a pointer may be placed at the end of each of the other leaf nodes so that the system can jump from leaf node to leaf node and read the sequentially stored tuples. Using pointers in a B-tree may, therefore, circumvent the need to traverse to a leaf node's parent or grandparent node to determine the storage location of the next leaf node. A B-tree with pointers, such as described above, may be referred to as a "point B-tree."

As B-trees are generally stored on a disk (e.g., solid state drive (SSD) or another non-volatile storage medium), accessing a B-tree involves issuing I/O or access requests to the disk. I/O requests to a disk are generally placed in a queue, e.g., in the order they are received. The depth of the queue, referred to as the queue depth, therefore, refers to the number of outstanding access requests to the disk. For a point B-tree, however, the maximum queue depth may be one. In other words, the system may only have a maximum of one outstanding access request to a point B-tree at any point in time. This is because each pointer indicates the storage location of only the next leaf node and not any other leaf nodes. For example, the pointer at the end of leaf node 114 only points to the storage location of leaf node 116. In order for the system to determine the storage location of leaf node 118, the system would have to first read the pointer placed in leaf node 116 and so on. In other words, only after reading one leaf node from the hard disk is the system able to determine the storage location of the next. As such, the system cannot generate more than one access request at the same time and, therefore, the maximum queue depth may be one for point B-trees.

Because the queue depth of a point B-tree cannot exceed one outstanding access request at a time, in certain cases, the size of each leaf node in the B-tree may be restricted to being large enough so that the performance of the hard disk is optimized. Generally, the latency associated with accessing a disk does not have a linear correlation with the size of the data (e.g., the size of the I/O) that is retrieved from the disk. In other words, up to a certain point, there is very little incremental cost or increase in latency as a result of increasing the size of the data that has to be retrieved from the disk. As such, up to a certain point, increasing the size of data that each leaf node stores helps with reducing the latency associated with accessing the disk and optimizes disk performance. However, there may be disadvantages in enforcing a restriction on the size of the leaf nodes (i.e., restricting each node from being smaller than a certain size).

As an example, when inserting a tuple into a leaf node, the system may be configured to read the leaf node into memory, insert the tuple in the leaf node and then keep the leaf node in memory in case additional tuples in the leaf nodes need to be updated. After a while, however, the leaf node may have to be written back out to the B-tree on disk because there may not be sufficient space in memory. In such an example, the write amplification associated with writing out a leaf node is larger for a large leaf node than a smaller leaf node. Write amplification is an undesirable phenomenon associated with SSDs, where the actual amount of information (e.g., the entire leaf node including the tuple) physically-written to the storage media is a multiple of the logical amount intended to be written (e.g., the tuple that is being inserted into the leaf node).

In order to reduce the latency associated with I/O operations performed on a B-tree, in some cases, data associated with one or more nodes in each level of the tree may be stored in sequential pages on disk. Such a B-tree may be referred to herein as a "bulk-loaded B-tree." Sequential pages may refer to sequential disk blocks or pages that are sequentially (e.g., consecutively) located and/or addressed on disk and are free to be allocated to nodes. U.S. application Ser. No. 16/353,535 describes bulk loading a B-tree. Bulk loading a B-tree ensures that data stored in one or more leaf nodes in each level of the B-tree is sequentially stored on disk, although, in some cases, data between some of the leaf nodes may not be sequential. U.S. application Ser. No. 16/353,535 is hereby incorporated by reference in its entirety.

Figure 2:
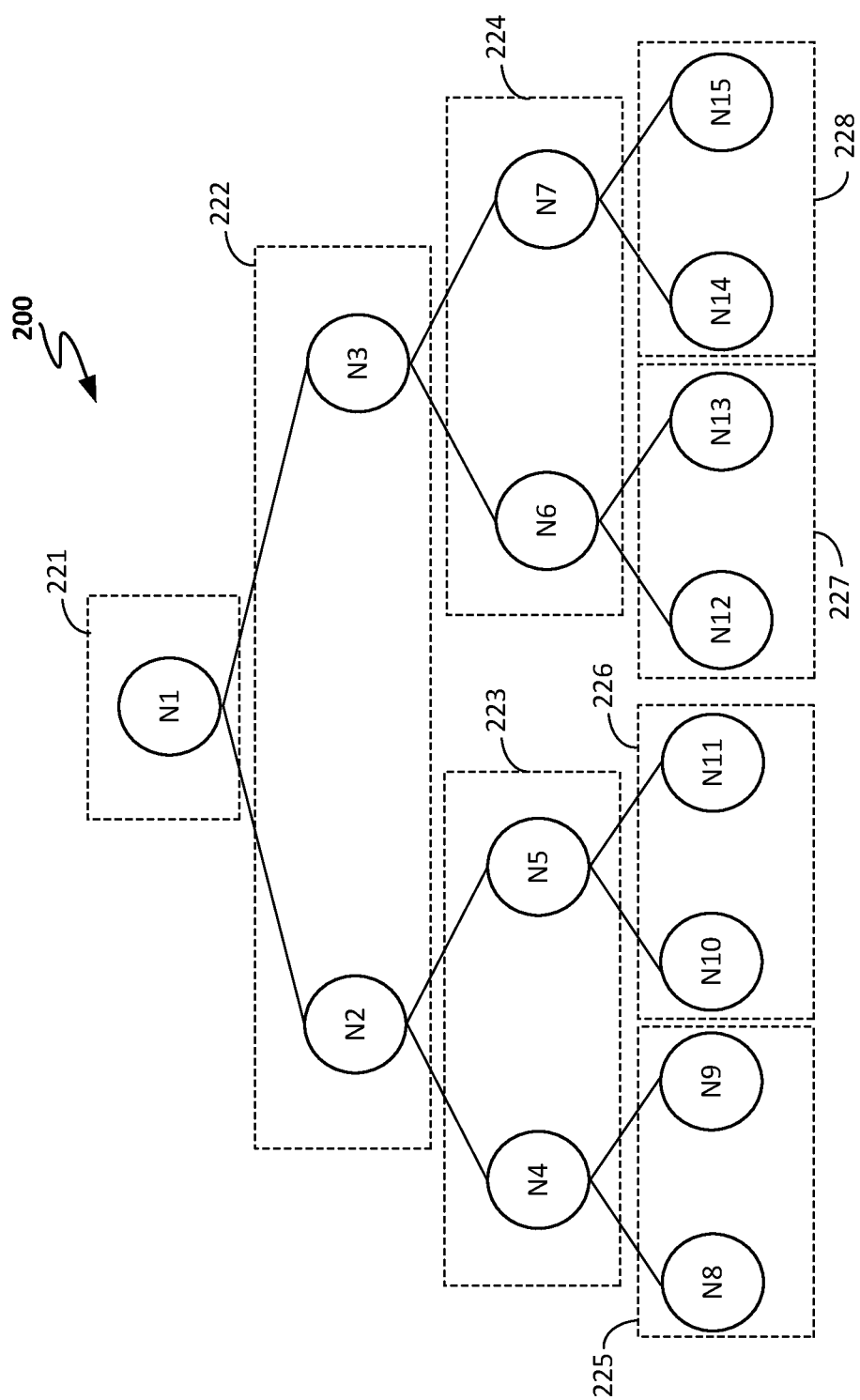
FIG. 2 illustrates a block diagram of an example bulk-loaded B-tree, according to embodiments of the present disclosure.

An example of a bulk-loaded B-tree is shown in FIG. 2. More specifically, FIG. 2 illustrates a B-tree 200 with four levels, with root node N1, branch nodes N2-N7, and leaf nodes N8-N15. As shown, except for root node N1, every two nodes of B-tree 200 are stored in a page group (shown with dashed lines). Each page group shown in FIG. 2 comprises a number of sequential pages. For example, branch nodes N2 and N3 are stored in page group 222, represented by a dashed box around nodes N2 and N3 (i.e., N2 and N3 are grouped into the same group). Similarly, leaf nodes N8 and N9 are stored in page group 225, and so on. Root node N1 is the only node that is stored in a page group, shown as page group 221, by itself. In certain embodiments, the number of pages in each page group is based on an optimal I/O size of the system. For example, if the system has an optimal I/O size of 32 kb and each page can store 4 kb of data, then each page group may include eight pages. In certain embodiments, all page groups have the same size. In certain other embodiments, only page groups storing the leaf nodes are equal in size. Bulk loading a B-tree allows for more efficiently reading or scanning data from the B-tree. Note that although in the example of FIG. 2 there are only two nodes in each page group (expect for root node N1), in other examples, there may be a larger or smaller number of nodes in each of the page groups. For example, a bulk-loaded B-tree may be structured such that each page group (except for the page group storing the root node) may store 32 nodes of the B-tree.

Certain embodiments described herein provide a read iterator object (also referred to herein as "ritor") that is configured to allow for pre-fetching nodes from a bulk-loaded B-tree, thereby, reducing the number or the cost of repeatedly accessing the B-tree during a read operation. More specifically, the ritor described herein includes a data structure having a stack of queues, one queue for each level of the B-tree, which are instantiated in memory. Note that, herein, memory may refer to volatile memory, such as random access memory (RAM), while disk refers to non-volatile memory, such as SSD. The ritor further comprises a function that configures the system to load nodes of the B-tree from disk into the stack of queues during a read operation. As described below, because the B-tree is bulk-loaded, the ritor function, at times, loads nodes from the B-tree for later use, which is referred to herein as pre-fetching the nodes. In other words, a node that is pre-fetched into a queue is a node that is not accessed or consumed immediately after it is loaded into the queue. Pre-fetching is described in more detail in relation to FIGS. 4 and 5.

Figure 3A:
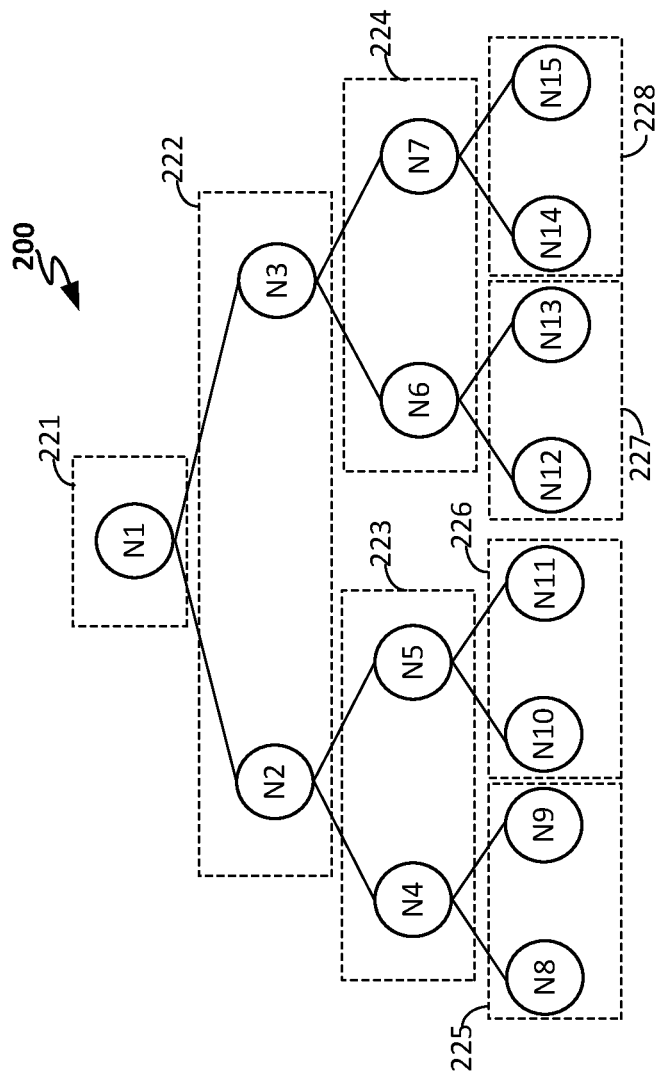
FIG. 3A illustrates a block diagram of an example bulk-loaded B-tree, according to embodiments of the present disclosure.
Figure 3B:
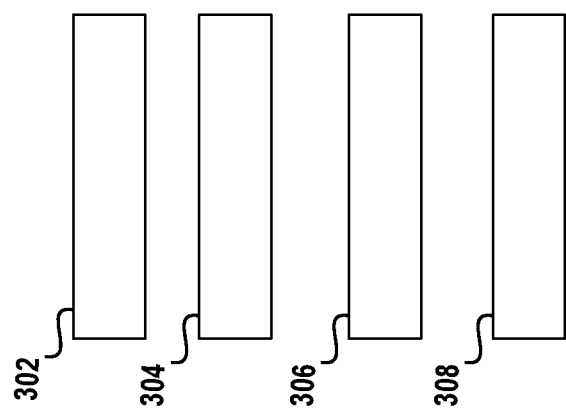
FIG. 3B illustrates queues corresponding to the different levels of the bulk-loaded B-tree of FIG. 3A, according to embodiments of the present disclosure.

FIGS. 3A-3B illustrate an example stack of queues 302-308 associated with B-tree 200. Each of queues 302-308 is instantiated for loading node(s) from a certain level of B-tree 200 into memory. For example, queue 302 is instantiated for loading root node N1 while queue 304 is instantiated for loading branch nodes N2 and N3, and so on. In certain embodiments, each queue corresponds to an array with a certain length. Although, in other embodiments, a queue may have a data structure other than an array. Also, in certain embodiments, all the queues have the same length while, in other embodiments, the length of the queues may vary. Loading a node into a queue refers to loading the node into memory and creating a corresponding pointer or reference in the queue, the reference pointing to the memory location of the node in memory. For example, loading N1 into queue 304 refers to loading N1 into memory at a certain location or address in memory and creating a pointer in queue 304 that points to the address in memory. The functionality of the ritor is described in FIG. 4 in relation to an example provided in FIGS. 5A-5B.

Figure 4:
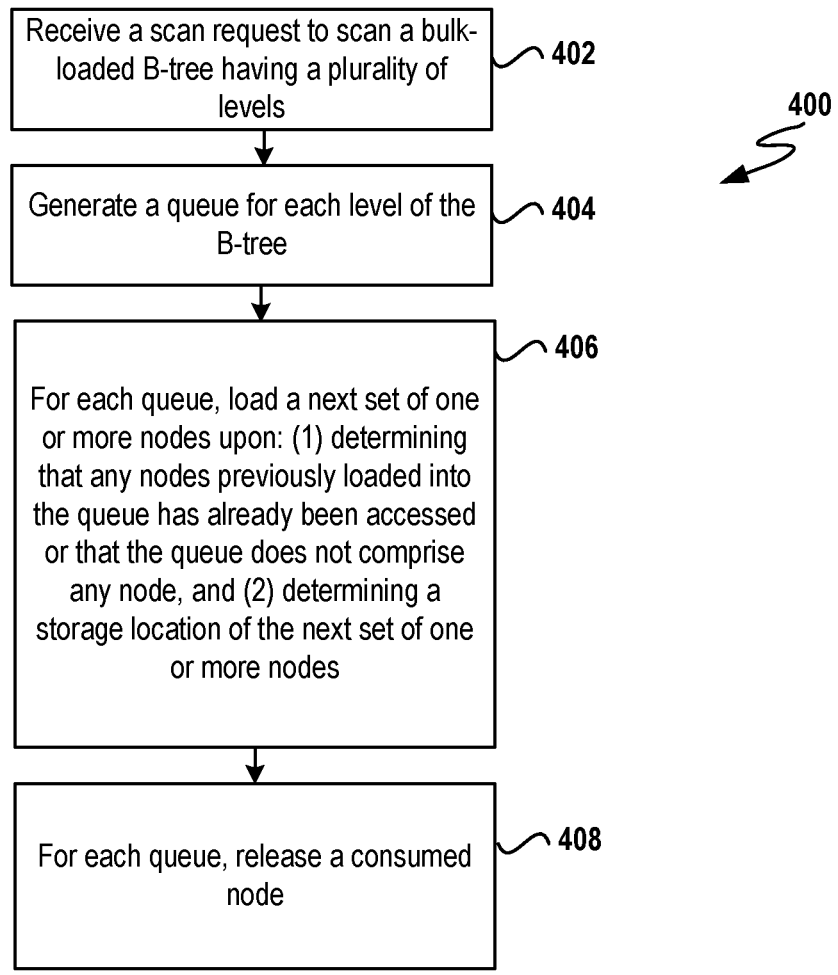
FIG. 4 illustrates a flow diagram of example operations for performing a scan operation on the bulk-loaded B-tree of FIG. 3A using a read iterator thread, according to embodiments of the present disclosure.
Figure 5A:
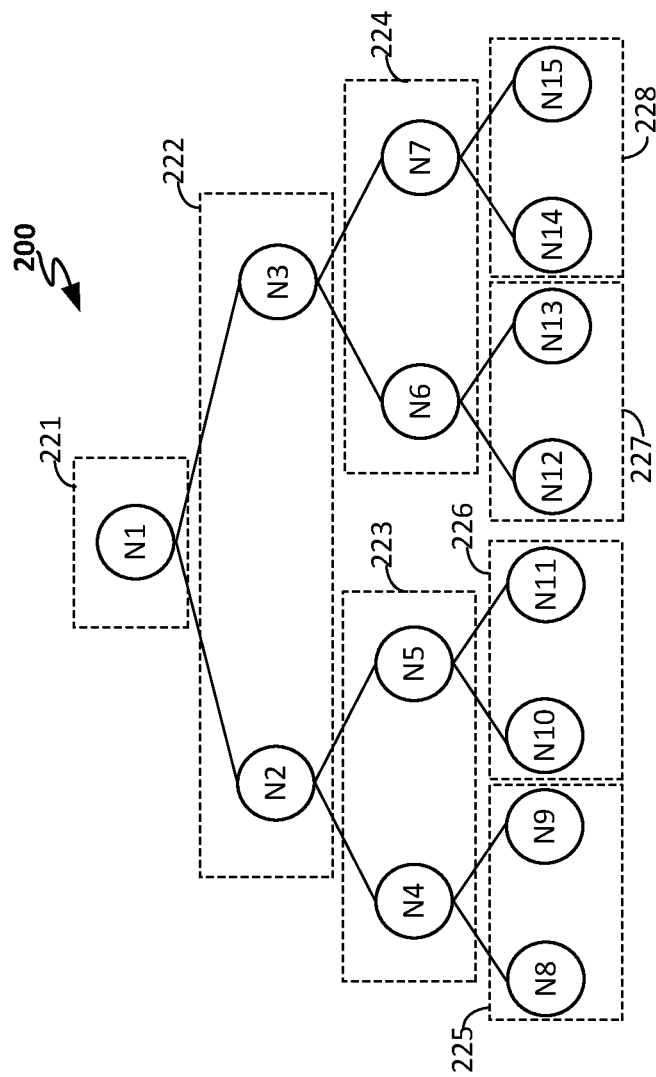
FIG. 5A illustrates the bulk-loaded B-tree of FIG. 3A, according to embodiments of the present disclosure.
Figure 5B:
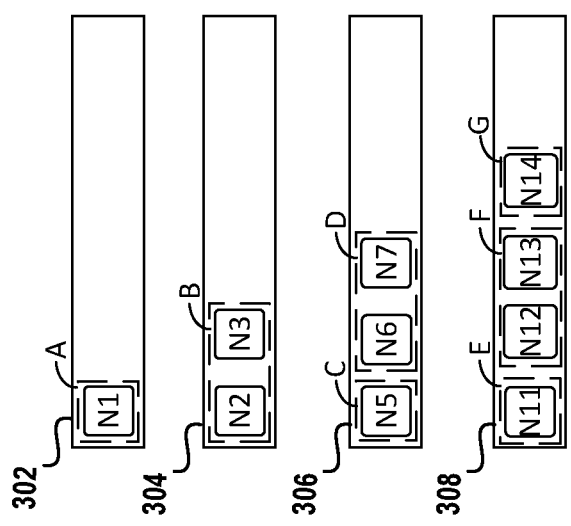
FIG. 5B illustrates the queues of FIG. 3B corresponding to the bulk-loaded B-tree of FIG. 3A, in accordance with embodiments of the present disclosure.
Figure 6:
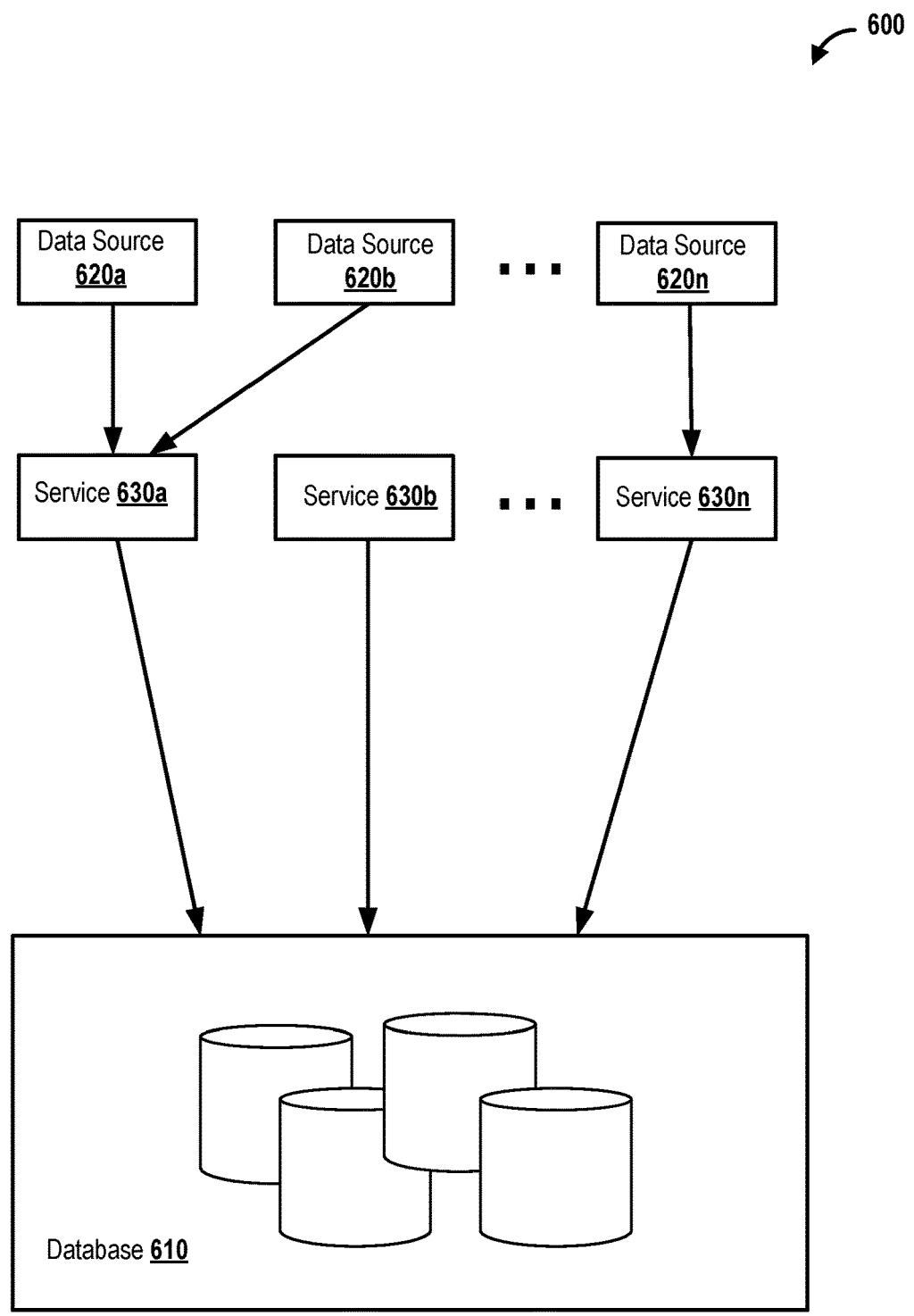
FIG. 6 illustrates components of an example system in which an embodiment may be implemented.

FIG. 4 illustrates example scan operations 400 performed on B-tree 200 by a system. An example of a system that may perform operations 400 is shown in FIG. 6. Operations 400 are described with reference to B-tree 200 shown in FIGS. 5A-5B.

At step 402, the ritor receives a scan request to scan a B-tree having a plurality of levels. For example, the ritor receives a scan request to scan B-tree 200 of FIGS. 5A-5B. In certain embodiments, the scan request may comprise a start key and an end key. Operations 400 are described with reference to an example where the scan request indicates a start key corresponding to a tuple stored in leaf node N11 and an end key corresponding to a tuple in node N14 of B-tree 200, shown in FIGS. 5A-5B. For simplicity, the tuple stored in leaf node N11 is referred to as tuple $T_s$ (e.g., starting tuple) while the tuple stored in leaf node N14 is referred to as tuple $T_e$ (e.g., ending tuple).

At step 404, the ritor generates a queue for each level of the B-tree. In the example of FIGS. 5A-5B, the ritor generates queues 302-308 for the four levels of B-tree 200. In certain embodiments, the ritor generates queues 302-308 in response to the scan request received at step 402. For example, based on the scan request and the structure of B-tree 200, the ritor may instantiate a ritor with queues 302-308. In certain other embodiments, queues 302-308 may have been generated even prior to the receipt of the scan request. For example, upon or at some point after a B-tree is created, the system may instantiate a ritor with queues corresponding to the levels of the B-tree. In certain embodiments, the ritor may change the number of queues in response to changes in the number of levels of a B-tree.

At step 406, for each queue, the ritor thread loads a next set of one or more nodes upon (1) determining that all nodes previously loaded into the queue have already been accessed or that the queue is empty, and (2) determining a storage location of a node of the next group of nodes for loading into the queue. For example, the ritor may provide a ritor thread that continuously and separately determines whether both of the conditions described above are met for any of queues 302-308. As soon as the two conditions are met for a queue, the ritor thread issues an I/O or load request to the disk and loads the next group of nodes into the corresponding queue. If the two conditions are not met for a queue, the ritor thread does not issue a load request until both of those conditions are met. For each queue, the ritor thread continues step 406 of operations 400 until tuples $T_s$ through $T_e$ are all loaded into memory. Note that, for simplicity, a queue for which the two conditions are met may be referred to as an eligible queue. Also note that accessing a root or branch node refers to reading at least some information (e.g., one tuple) in the node.

In the example of FIGS. 5A-5B, before any nodes are loaded into any of the queues 302-308, the ritor thread checks to determine whether any of the queues are eligible. At this point, only queue 302 is eligible because, other than for queue 302, the ritor thread is not able to determine the storage location of nodes at any other levels of B-tree 200 (i.e., the second condition is not met for queues 304-308). For example, for queue 302, the ritor thread determines (1) that queue 302 is empty (e.g., a node has not been loaded into the queue yet) and (2) that the system is able to locate the storage location of root node N1 in the first level of B-tree 200. The storage location of N1 is the same as the starting storage location of B-tree 200. Because queue 302 is eligible, the ritor thread loads N1 into queue 302, as shown. Note that the order with which nodes are loaded into memory (i.e., queues 302-308) is shown with alphabetical letters. For example, the loading of N1 into queue 302, is shown as step A. Also, in FIGS. 5A-5B, each of the dashed lines in queues 302-308 refers to the entire load that is placed into a queue at a certain step. For example, the dashed line in queue 302 refers to the load that is retrieved at step A into queue 302.

Once N1 is loaded, the ritor thread determines that there are no additional nodes to load into queue 302 and, therefore, queue 302 becomes ineligible. In certain embodiments, once a queue becomes ineligible because there are no additional nodes in the corresponding level of the B-tree, moving forward, the ritor thread may cease to check the eligibility of the queue.

Once loaded, the ritor thread accesses N1, which points to the storage location of at least N2, thereby making queue 304 eligible. More specifically, queue 304 is now eligible because (1) queue 304 is empty, and (2) the ritor thread is now able to determine the storage location of at least N2. Based on the information included in N1, the ritor thread determines that to find the starting key $T_s$, it needs to examine one or more of the leaf nodes under N2. Using the storage location of N2, the system thereby issues a load request, which results in loading both N2 and N3 into queue 304 at step B.

The reason the ritor thread loads both N2 and N3 into queue 304 at the same time is that, in some embodiments, the system's I/O or load size is the same as the size of each page group in B-tree 200. As such, in this example, the ritor thread issues a load request to the disk, indicating a starting address of N2's storage location and a load size corresponding to the size of page group 222. As described above, within each page group, the nodes are stored in sequential pages in the page group. Accordingly, by configuring the system's load size to be equal to the size of each page group, the system may load as many nodes as there are in the page group. In this example, the system only needs to access N2 at first to locate and scan $T_s$, but the system is able to pre-fetch N3 as well. Pre-fetching N3 eliminates the need to later traverse to N1 again to determine the storage location of N3 and load N3 in a separate I/O to the disk. Note that N3 has to be loaded and accessed at some later point because the ending key $T_e$ is in leaf node N12, which is under N3. However, hypothetically, if $T_e$ were not located in a node or a sub-tree under N3, pre-fetched N3 may not be used. Although, any inefficiency from such an unused pre-fetch may be minimal compared to the efficiency gains from used pre-fetches.

After loading N2 and N3 into queue 304, the ritor thread determines that to find starting key $T_s$, it needs to access N2. Accordingly the ritor thread accesses N2, which points to the storage locations of N4 and N5, meaning that the ritor thread is now able to determine the storage locations of nodes that can be loaded into queue 306, thereby making queue 306 eligible. As for queue 304, the ritor thread determines that there are no additional nodes in the second level of B-tree, thereby, making queue 304 ineligible. Although, the ritor thread is able to load both N4 and N5 into queue 306, to find starting key $T_s$, the ritor thread only needs to examine the leaf nodes under N5. In other words, as a general rule, the ritor thread only loads nodes within a group that include at least one key higher than the start key or that have unknown keys. As such, in this example, the ritor thread loads only N5 into queue 306 at step C.

After loading N5 into queue 306, the ritor thread accesses N5, which includes pointers to the storage locations of N10 and N11. At this point, both queues 306 and 308 become eligible. More specifically, for queue 306, the ritor thread is able to determine: (1) N5, which is the only node loaded into queue 306 at step C, is accessed already, and (2) the storage location of at least one node in the next group of nodes (e.g., N6 and N7) in the third level of B-tree 200 by accessing N3. Similarly, for queue 308, the ritor thread is able to determine: (1) the queue is empty, and (2) the storage location of at least one node in the next group of nodes (e.g., N10) based on the pointers included in N5. In some embodiments, the ritor thread may prioritize pre-fetching and, therefore, first load N6 and N7 into queue 306. In such embodiments, the ritor thread accesses N3, determines the storage locations of N6, and then loads N6 and N7 into queue 306 at step D. After loading N6 and N7 into queue 306, the ritor thread loads N11 into queue 308 at step E. Note that loading N10 is unnecessary because starting key $T_s$ is in N11. Although not shown, in some other embodiments, the ritor thread may instead be configured to first load N11 into queue 308. In such embodiments, the ritor thread loads N6 and N7 after N11 is loaded.

Once loaded, the system is able to find $T_s$ and start sequentially scanning tuples that are placed after $T_s$ in N11. After the system starts scanning N11, the ritor thread accesses N6, which points to the storage locations of N12 and N13, thereby making queue 308 eligible again. Queue 308 becomes eligible because (1) N11 has been accessed and (2) the ritor thread is able to determine the storage locations of at least N12. Therefore, in some examples, while the system is still scanning tuples in N11, the ritor thread pre-fetches N12 and N13 into queue 308, at step F. After the ritor thread loads N12 and N13, the ritor thread accesses N7, which points to the storage locations of N14. Using the storage location of N14, the ritor thread loads N14 into queue 308, at step G. Note that N15 is not loaded because the ritor thread is able to determine that loading N15 is not necessary for completing the scan request, because $T_e$ is in N14. In other words, as a general rule, the ritor thread only loads nodes within a group that include at least one key lower than the end key or that have unknown keys. At the time N14 is loaded into queue 308, the system may be still scanning one of N11, N12, or N13. Once the system completes scanning $T_e$, the scan operation is complete.

At step 408, for each queue, the ritor thread releases a node once the node is consumed (also referred to as a "consumed node"). In some embodiments, a consumed root or branch node may refer to a node whose child nodes have all been loaded into the queues. A consumed leaf node may refer to a leaf node that has been entirely scanned. A consumed node is no longer needed to complete the scan request. In other words, a consumed node does not provide any additional information that is useful for performing the scan request and, therefore, it is not necessary to keep the consumed node into memory. For example, once the ritor thread loads N2 and N3 into queue 304 and determines that N1 does not have any additional child nodes that can be loaded into queue 302, the ritor thread may release N1 from queue 302. Releasing N1 from queue 302 refers to removing the reference or pointer to a memory location of where N1 is stored in memory, from queue 302. Once the reference is removed, the system may determine to remove the consumed node from memory altogether. For example, the system may remove the consumed node from memory if there is not enough space in memory. In another example, the system may determine to keep the consumed node in memory, even after the reference is removed, because there are other references to the consumed node or because there is enough space in memory. Note that step 408 can be performed for each queue while step 406 is still being performed for the queue.

Although in certain embodiments a scan request indicates a start key and an end key, in some other embodiments, a scan request may not indicate an end key. For example, in such embodiments, the scan request may indicate a request for scanning the entire B-tree starting from the first tuple in the left most leaf node. In another example, the scan request may indicate a request for scanning all nodes of the B-tree starting after a certain starting tuple (e.g., not necessarily first tuple in the left most leaf node). For example, a scan request may indicate a request to scan the entire B-tree 200 starting from the first tuple in the left most leaf node, N8, in B-tree 200.

In another example, a scan request may indicate a request to scan all nodes of B-tree 200 starting from a tuple in, for example, N10 (or any other lead node). In these examples, the ritor thread may be configured to perform step 406 of operations 400 differently. More specifically, in such examples, step 406 may configure the system such that: for each queue, the ritor loads a next set of one or more nodes upon determining a storage location of the next set of one or more nodes for loading into the queue. In other words, in examples where no end key is indicated by the scan request, the first condition of step 406 can be skipped by the ritor thread. Skipping the first condition allows the ritor thread to pre-fetch nodes in a more expeditious manner. This can be illustrated with an example, where a scan request may indicate a request to scan all tuples in B-tree 200 starting from a starting tuple $T_s$ in N8. In such an example, the ritor thread first loads N1 into queue 302 and then loads N2 and N3 into queue 304. Subsequently, the ritor thread loads N4 and N5 into queue 306. However, instead of waiting for N5 to be accessed before additional nodes (N6 and N7) are loaded into queue 306, the ritor thread is configured to load N6 and N7 because the storage location of at least N6 can be determined based on N3. In such an example, because all tuples stored after $T_s$ in N8 are supposed to be scanned, prefetching as many nodes as possible into every queue is beneficial and does not result in wasted memory space etc. (e.g., because all the loaded nodes will be used eventually).

FIG. 6 illustrates components of a system 600 in which an embodiment may be implemented. As shown, system 600 includes a database 610, multiple data sources 620 (e.g., data sources 620a, 620b, . . . , 620n), and multiple database management services 630 (e.g., database management services 630a, 630b, . . . 630n). Though multiple data sources 620 and multiple database management services 630 are shown, it should be noted that there may be any number of data sources or database management services in system 600.

Database 610 may include any suitable non-volatile data store for organizing and storing data from the multiple data sources 620. For example, in some embodiments, database 610 may be implemented as software-defined storage such as VMware vSAN that clusters together server-attached hard disks and/or solid state drives (HDDs and/or SSDs), to create a flash-optimized, highly resilient shared datastore designed for virtual environments. In some embodiments, database 610 may be implemented as one or more storage devices, for example, one or more hard disks, flash memory modules, solid state disks, and optical disks (e.g., in a computing device, server, etc.). In some embodiments, database 610 may include a shared storage system having one or more storage arrays of any type such as a network-attached storage (NAS) or a block-based device over a storage area network (SAN). Database 610 may store data from one or more data sources 620 in a B-tree structure as discussed.

Each data source 620 may correspond to one or more physical devices (e.g., servers, computing devices, etc.) or virtual devices (e.g., virtual computing instances, containers, virtual machines (VMs), etc.). For example, a physical device may include hardware such as one or more central processing units, memory, storage, and physical network interface controllers (PNICs). A virtual device may be a device that represents a complete system with processors, memory, networking, storage, and/or BIOS, that runs on a physical device. For example, the physical device may execute a virtualization layer that abstracts processor, memory, storage, and/or networking resources of the physical device into one more virtual devices. Each data source 620 may generate data that is loaded into database 610. Each data source 620 may request operations, such as operations 400, to be performed on the database 610.

Each database management service 630 may be a process or application executing on one or more physical devices or virtual devices. In certain embodiments, a database management service 630 may execute on the same device as a data source 620. In certain embodiments, a database management service 630 may execute on a separate device from the data source 620. A database management service 630 may be an automatic service, or a manual service (e.g., directed by a human).

Each database management service 630 may be coupled (e.g., via a network, as running on the same device, etc.) to one or more data sources 620 and to the database 610 (e.g., via a network). Further, each database management service 630 may be configured to generate and perform operations (e.g., operations 400) on database 610. For example, a given data source 620 may send a scan request for a range of tuples in database 610 to a database management service 630. Database 610 may be implemented as a B-tree as discussed above. The database management service 630 may perform the scan operation on database 610 as discussed above.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be implemented as useful machine operations. In addition, one or more embodiments of the invention also relate to a device or an apparatus for performing these operations. The apparatus may be specially constructed for required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media that may be based on any existing or subsequently developed technology for embodying computer programs in a manner that enables them to be read by a computer. Examples of a computer readable medium include a hard drive, a Solid State Disk (SSD), network attached storage (NAS), read-only memory, random-access memory (e.g., a flash memory device), a CD (Compact Discs) CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims.

What is claimed is:

1. A method of scanning a B-tree, comprising:
receiving a scan request to scan a B-tree having a plurality of levels, each level comprising one or more nodes, wherein for each of one or more levels of the plurality of levels, nodes are grouped into groups, where nodes of any given group are stored across sequential disk blocks, wherein the scan request indicates a start key corresponding to a first tuple within the B-tree;
generating a queue for each level of the B-tree; and
for each queue, loading into memory a next group of nodes based upon determining a storage location of a node of the next group of nodes, wherein loading the next group of nodes comprises loading only nodes within the next group of nodes that include at least one key higher than the start key or that have an unknown key.

2. The method of claim 1, further comprising, for each queue:
determining that all nodes previously loaded into the queue have already been accessed or that the queue is empty, wherein a given node has been accessed when at least some information in the given node has been read; and
wherein loading the next group of nodes is further based upon the determining that all nodes previously loaded into the queue have already been accessed or that the queue is empty.

3. The method of claim 1, further comprising:
determining that a given node has been consumed when all child nodes of the given node have been loaded into memory; and
releasing memory corresponding to any node determined to be consumed.

4. The method of claim 1, wherein:
the scan request further indicates an end key; and
loading the next group of nodes comprises loading only nodes within the next group of nodes that include at least one key higher than the start key and lower than the end key or that have an unknown key.

5. The method of claim 1, wherein a size of each group is equal to an I/O size used for the loading.

6. The method of claim 1, wherein a queue is deemed ineligible when there are no additional nodes in a corresponding level of the B-tree to be loaded into the queue.

7. An apparatus, comprising:
memory; and
one or more processors, the memory and the one or more processors configured to cause the apparatus to:
receive a scan request to scan a B-tree having a plurality of levels, each level comprising one or more nodes, wherein for each of one or more levels of the plurality of levels, nodes are grouped into groups, where nodes of any given group are stored across sequential disk blocks, wherein the scan request indicates a start key corresponding to a first tuple within the B-tree;
generate a queue for each level of the B-tree; and
for each queue, load into memory a next group of nodes based upon determining a storage location of a node of the next group of nodes, wherein the memory and the one or more processors are configured to cause the apparatus to load only nodes within the next group of nodes that include at least one key higher than the start key or that have an unknown key.

8. The apparatus of claim 7, wherein:
the memory and the one or more processors are further configured to, for each queue, determine that all nodes previously loaded into the queue have already been accessed or that the queue is empty, wherein a given node has been accessed when at least some information in the given node has been read; and
loading the next group of nodes is based upon the determination that all nodes previously loaded into the queue have already been accessed or that the queue is empty.

9. The apparatus of claim 7, wherein the memory and the one or more processors are further configured to cause the apparatus to:

determine that a given node has been consumed when all child nodes of the given node have been loaded into memory; and release memory corresponding to any node determined to be consumed.

10. The apparatus of claim 7, wherein:

the scan request indicates an end key; and the memory and the one or more processors configured to cause the apparatus to load the next group of nodes are configured to load only nodes within the next group of nodes that include at least one key higher than the start key and lower than the end key or that have an unknown key.

11. The apparatus of claim 7, wherein a size of each group is equal to an I/O size used for the loading.

12. The apparatus of claim 7, wherein a queue is deemed ineligible when there are no additional nodes in a corresponding level of the B-tree to be loaded into the queue.

13. A non-transitory computer readable medium storing instructions which, when executed by a computing system, cause the computing system to perform operations for scanning a B-tree, the operations comprising:

receiving a scan request to scan the B-tree having a plurality of levels, each level comprising one or more nodes, wherein for each of one or more levels of the plurality of levels, nodes are grouped into groups, where nodes of any given group are stored across sequential disk blocks, wherein the scan request indicates an end key; and generating a queue for each level of the B-tree; and for each queue, loading into memory a next group of nodes based upon determining a storage location of a node of the next group of nodes, wherein loading the next group of nodes comprises loading only nodes within the next group of nodes that include at least one key lower than the end key or that have an unknown key.

14. The non-transitory computer readable medium of claim 13, wherein the operations further comprise, for each queue:

determining that all nodes previously loaded into the queue have already been accessed or that the queue is empty, wherein a given node has been accessed when at least some information in the given node has been read; and wherein loading the next group of nodes is further based upon the determining that all nodes previously loaded into the queue have already been accessed or that the queue is empty.

15. The non-transitory computer readable medium of claim 13, wherein the operations further comprise:

determining that a given node has been consumed when all child nodes of the given node have been loaded into memory; and releasing memory corresponding to any node determined to be consumed.

16. The non-transitory computer readable medium of claim 13, wherein:

the scan request further indicates a start key corresponding to a first tuple within the B-tree; and loading the next group of nodes comprises loading only nodes within the next group of nodes that include at least one key lower than the end key and higher than the start key or that have an unknown key.

17. The non-transitory computer readable medium of claim 13, wherein a size of each group is equal to an I/O size used for the loading.

18. The non-transitory computer readable medium of claim 13, wherein a queue is deemed ineligible when there are no additional nodes in a corresponding level of the B-tree to be loaded into the queue.

* * * * *